US011048507B2

(12) United States Patent
Valentine et al.

(10) Patent No.: US 11,048,507 B2
(45) Date of Patent: Jun. 29, 2021

(54) COMPRESSED INSTRUCTION FORMAT

(71) Applicant: Intel Corporation, Santa Clara, CA (US)

(72) Inventors: Robert Valentine, Kiryat Tivon (IL); Doron Orenstein, Haifa (IL); Bret L. Toll, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/155,028

(22) Filed: Oct. 9, 2018

(65) Prior Publication Data

US 2019/0310846 A1 Oct. 10, 2019

Related U.S. Application Data

(63) Continuation of application No. 15/431,652, filed on Feb. 13, 2017, now Pat. No. 10,095,515, which is a continuation of application No. 14/307,468, filed on Jun. 17, 2014, now Pat. No. 9,569,208, which is a continuation of application No. 13/843,993, filed on Mar. 15, 2013, now Pat. No. 8,756,403, which is a continuation of application No. 13/607,594, filed on Sep. 7, 2012, now Pat. No. 8,504,802, which is a continuation of application No. 11/965,669, filed on Dec. 27, 2007, now Pat. No. 8,281,109.

(51) Int. Cl.
*G06F 9/30* (2018.01)
*G06F 9/38* (2018.01)

(52) U.S. Cl.
CPC .............. *G06F 9/30* (2013.01); *G06F 9/3017* (2013.01); *G06F 9/30145* (2013.01); *G06F 9/30149* (2013.01); *G06F 9/30174* (2013.01); *G06F 9/30178* (2013.01); *G06F 9/30185* (2013.01); *G06F 9/382* (2013.01); *G06F 9/3816* (2013.01)

(58) Field of Classification Search
None
See application file for complete search history.

(56) References Cited

U.S. PATENT DOCUMENTS

| | | |
|---|---|---|
| 5,438,668 A | 8/1995 | Coon et al. |
| 5,592,635 A | 1/1997 | Chan |
| 5,604,876 A | 2/1997 | Matsui |

(Continued)

FOREIGN PATENT DOCUMENTS

| | | |
|---|---|---|
| CN | 1624653 A | 6/2005 |
| CN | 1846193 A | 10/2006 |
| JP | H11259293 A | 9/1999 |

OTHER PUBLICATIONS

IBM Technical Disclosure Bulletin NA9003349 "Opcode Remap and Compression in Hard Wired RISC Microprocessor," Mar. 1990. (Year: 1990).*

(Continued)

*Primary Examiner* — Steven G Snyder
(74) *Attorney, Agent, or Firm* — Nicholson De Vos Webster & Elliott, LLP

(57) ABSTRACT

A technique for decoding an instruction in a variable-length instruction set. In one embodiment, an instruction encoding is described, in which legacy, present, and future instruction set extensions are supported, and increased functionality is provided, without expanding the code size and, in some cases, reducing the code size.

19 Claims, 8 Drawing Sheets

(56) References Cited

U.S. PATENT DOCUMENTS

| | | | |
|---|---|---|---|
| 5,680,568 | A | 10/1997 | Sakamura |
| 5,689,672 | A | 11/1997 | Witt et al. |
| 5,699,536 | A | 12/1997 | Hopkins et al. |
| 5,740,392 | A * | 4/1998 | Brennan ............ G06F 9/30152 712/210 |
| 5,809,273 | A * | 9/1998 | Favor ................. G06F 9/30152 712/210 |
| 5,881,260 | A | 3/1999 | Raje et al. |
| 5,884,071 | A | 3/1999 | Kosaraju |
| 6,014,735 | A | 1/2000 | Chennupaty et al. |
| 6,041,403 | A * | 3/2000 | Parker .................... G06F 9/28 712/210 |
| 6,049,862 | A * | 4/2000 | Bauer ................. G06F 9/30156 712/208 |
| 6,101,592 | A | 8/2000 | Pechanek et al. |
| 6,157,996 | A * | 12/2000 | Christie ............. G06F 9/30072 712/208 |
| 6,240,506 | B1 | 5/2001 | Miller |
| 6,496,923 | B1 | 12/2002 | Gruner et al. |
| 6,539,470 | B1 | 3/2003 | Mahurin et al. |
| 6,557,094 | B2 | 4/2003 | Pechanek et al. |
| 6,581,131 | B2 | 6/2003 | Vondran et al. |
| 6,625,724 | B1 | 9/2003 | Kahn et al. |
| 6,654,874 | B1 * | 11/2003 | Lee .................... G06F 9/30178 712/209 |
| 6,763,449 | B1 | 7/2004 | Sugano et al. |
| 6,807,622 | B1 | 10/2004 | McGrath |
| 6,877,084 | B1 | 4/2005 | Christie |
| 7,058,791 | B1 | 6/2006 | Hughes et al. |
| 7,313,671 | B2 | 12/2007 | Leijten et al. |
| 7,328,328 | B2 | 2/2008 | Henry et al. |
| 7,353,368 | B2 | 4/2008 | Chow et al. |
| 7,395,412 | B2 | 7/2008 | Henry et al. |
| 7,421,566 | B2 * | 9/2008 | Gschwind ........... G06F 9/30101 712/210 |
| 7,590,832 | B2 | 9/2009 | Taniuchi |
| 7,703,088 | B2 | 4/2010 | Li et al. |
| 7,793,081 | B2 * | 9/2010 | Gschwind ........... G06F 9/30181 712/216 |
| 7,836,278 | B2 | 11/2010 | Sudhakar et al. |
| 7,849,294 | B2 * | 12/2010 | Gschwind ........... G06F 9/30036 712/221 |
| 7,877,582 | B2 * | 1/2011 | Gschwind ........... G06F 9/30109 712/226 |
| 8,166,281 | B2 * | 4/2012 | Gschwind ............. G06F 3/012 712/216 |
| 8,312,424 | B2 * | 11/2012 | Gschwind ............... G06F 8/447 717/106 |
| 8,893,079 | B2 * | 11/2014 | Gschwind ............... G06F 8/447 717/105 |
| 8,893,095 | B2 * | 11/2014 | Gschwind ............... G06F 8/447 717/140 |
| 8,918,623 | B2 * | 12/2014 | Gschwind ........... G06F 9/30036 712/210 |
| 9,395,981 | B2 * | 7/2016 | Gschwind ........... G06F 9/30025 |
| 9,411,585 | B2 * | 8/2016 | Gschwind ........... G06F 9/30014 |
| 9,727,336 | B2 * | 8/2017 | Gschwind ........... G06F 9/30189 |
| 9,727,337 | B2 * | 8/2017 | Gschwind ........... G06F 9/30036 |
| 10,635,823 | B2 * | 4/2020 | Gutson ................. G06F 21/54 |
| 2001/0044891 | A1 | 11/2001 | McGrath et al. |
| 2003/0172252 | A1 | 9/2003 | Henry et al. |
| 2003/0200426 | A1 | 10/2003 | Lee et al. |
| 2003/0212879 | A1 | 11/2003 | Henkel et al. |
| 2003/0236964 | A1 | 12/2003 | Madduri |
| 2003/0236965 | A1 * | 12/2003 | Sheaffer .............. G06F 9/30076 712/209 |
| 2004/0210616 | A1 | 10/2004 | Debes et al. |
| 2004/0250053 | A1 | 12/2004 | McGrath et al. |
| 2004/0268090 | A1 | 12/2004 | Coke et al. |
| 2006/0026401 | A1 | 2/2006 | Chauvel |
| 2007/0038848 | A1 * | 2/2007 | Gschwind ............. G06F 9/3802 712/225 |
| 2007/0038984 | A1 * | 2/2007 | Gschwind ............... G06F 8/447 717/136 |
| 2008/0189519 | A1 * | 8/2008 | Gschwind ............. G06F 9/382 712/213 |
| 2008/0215856 | A1 * | 9/2008 | Gschwind ............... G06F 8/447 712/220 |
| 2009/0172356 | A1 * | 7/2009 | Valentine ........... G06F 9/30145 712/208 |
| 2009/0198966 | A1 * | 8/2009 | Gschwind ........... G06F 9/30109 712/208 |
| 2009/0198977 | A1 * | 8/2009 | Gschwind ........... G06F 9/30112 712/226 |
| 2009/0300331 | A1 * | 12/2009 | Gschwind ........... G06F 9/30145 712/213 |
| 2011/0271083 | A1 * | 11/2011 | Raubuch ............. G06F 9/30189 712/208 |
| 2012/0265967 | A1 * | 10/2012 | Gschwind ........... G06F 9/30032 712/210 |
| 2012/0297171 | A1 * | 11/2012 | Gschwind ............... G06F 8/447 712/220 |
| 2012/0297373 | A1 * | 11/2012 | Gschwind ............... G06F 8/447 717/151 |
| 2012/0331271 | A1 * | 12/2012 | Valentine ........... G06F 9/30174 712/209 |
| 2013/0073836 | A1 * | 3/2013 | Gschwind ........... G06F 9/30112 712/222 |
| 2013/0073838 | A1 * | 3/2013 | Gschwind ........... G06F 9/30025 712/226 |
| 2013/0080745 | A1 * | 3/2013 | Gschwind ........... G06F 9/30098 712/220 |
| 2013/0103932 | A1 * | 4/2013 | Gschwind ............. G06F 9/3016 712/222 |
| 2014/0281398 | A1 * | 9/2014 | Rash .................... G06F 9/3017 712/208 |
| 2014/0281399 | A1 * | 9/2014 | Rash .................... G06F 9/3017 712/209 |
| 2019/0042760 | A1 * | 2/2019 | Gutson ................. G06F 21/577 |
| 2020/0201633 | A1 * | 6/2020 | Madduri ............... G06F 9/3001 |

OTHER PUBLICATIONS

'An Instruction Stream Compression Technique' by Peter L. Bird and Trevor N. Mudge, Nov. 27, 1996. (Year: 1996).*

Advisory Action from U.S. Appl. No. 11/965,669, dated Jul. 26, 2011, 3 pages.

Advisory Action from U.S. Appl. No. 11/965,669, dated Sep. 9, 2011, 2 pages.

Decision on Rejection from foreign counterpart Chinese Patent Application No. 200810189862.8, dated May 22, 2012, 6 pages. (English translation only available).

Final Office Action from U.S. Appl. No. 11/965,669, dated May 12, 2011, 16 pages.

First Office Action and Search Report from foreign counterpart Chinese Patent Application No. 201210328169.0, dated Nov. 3, 2014, 29 pages.

First Office Action from foreign counterpart Chinese Patent Application No. 200810189862.8, dated Jul. 21, 2011, 9 pages.

Non Final Office Action from U.S. Appl. No. 11/965,669, dated Oct. 7, 2010.

Non Final Office Action from U.S. Appl. No. 11/965,669, dated Feb. 28, 2012, 9 pages.

Non-Final Office Action from U.S. Appl. No. 15/431,652, dated Jan. 22, 2018, 13 pages.

Non-Final Office Action from U.S. Appl. No. 13/607,594 dated Dec. 5, 2012, 13 pages.

Non-Final Office Action from U.S. Appl. No. 13/843,993 dated Sep. 13, 2013, 19 pages.

Non-Final Office Action from U.S. Appl. No. 14/307,468, dated Oct. 15, 2015, 7 pages.

Notice of Allowance from U.S. Appl. No. 14/307,468, dated Apr. 4, 2016, 6 pages.

Notice of Allowance from U.S. Appl. No. 14/307,468, dated Oct. 17, 2016, 13 pages.

(56) References Cited

OTHER PUBLICATIONS

Notice of Allowance from U.S. Appl. No. 11/965,669, dated Jun. 15, 2012, 9 pages.
Notice of Allowance from U.S. Appl. No. 13/607,594, dated Apr. 11, 2013, 8 pages.
Notice of Allowance from U.S. Appl. No. 13/843,993, dated Feb. 5, 2014, 8 pages.
Notice of Allowance from U.S. Appl. No. 15/431,652, dated Jun. 14, 2018, 16 pages.
Notification to Grant Patent Right for Invention from foreign counterpart Chinese Patent Application No. 200810189862.8, dated Jan. 12, 2016, 4 pages.
Notification to Grant Patent Right for Invention from foreign counterpart Chinese Patent Application No. 201210328169.0, dated May 16, 2016, 4 pages.
Second Office Action and Search Report from foreign counterpart Chinese Patent Application No. 200810189862.8, dated Jan. 26, 2015, 17 pages.
Second Office Action from foreign counterpart Chinese Patent Application No. 201210328169.0, dated Jun. 19, 2015, 11 pages.
Third Office Action from foreign counterpart Chinese Patent Application No. 200810189862.8, dated Jun. 30, 2015, 8 pages.
Third Office Action from foreign counterpart Chinese Patent Application No. 201210328169.0, dated Dec. 11, 2015, 7 pages.

\* cited by examiner

COMPRESSED INSTRUCTION FORMAT

FIELD OF THE INVENTION

Embodiments of the invention relate to microprocessors and microprocessor systems. In particular, at least one embodiment of the invention relates to an instruction encoding technique resulting in a compressed instruction format.

BACKGROUND OF THE DISCLOSURE

Microprocessor technology has evolved over the years at a fast rate. Advances in computer architecture and semiconductor technology have created many opportunities to design new processors. There are typically two options for designing new processors: (1) defining a completely new architecture, and (2) extending the current architecture to accommodate new features.

New processors involve new features in both hardware and software. A new processor based on existing design typically has an additional set of instructions that can take advantage of the new hardware design. However, extending an instruction set by adding a new set of instructions is a challenging problem because of the constraints in the encoding of the instructions and in storing instruction opcode maps. Therefore there is a need in the industry to provide an efficient method for extending an instruction set without increasing hardware complexity and without significantly expanding the number and size of opcode maps.

BRIEF DESCRIPTION OF THE DRAWINGS

The features and advantages of the invention will become apparent from the following detailed description of the invention in which.

DETAILED DESCRIPTION

At least one method, apparatus and system for extending an instruction set using embodiments of a unique instruction attribute encoding. Disclosed embodiments further enable an instruction set architecture to expand while conserving storage area for storing opcode maps associated with the instruction set architecture. In at least one embodiment, a set of existing instruction fields are mapped, compressed, or replaced by instruction attribute fields that may retain information associated with prior art instruction fields, but may result in a more compact instruction requiring less storage area for storing the instructions and instruction opcode maps. In one embodiment, instruction attribute encodings may enable further instruction and micro-architectural features, including an extra source operand to be used by some instructions as well as an increased data size for instructions, such as vector instructions (e.g., single-instruction-multiple-data (SIMD) instructions).

In the following description, for purposes of explanation, numerous specific details such as processor types, instruction formats, logic gate types, and escape opcode values are set forth in order to provide a thorough understanding of embodiments of the invention. However, it will be apparent to one skilled in the art that these specific details are not required in order to practice embodiments the invention. In other instances, well-known electrical structures and circuits are shown in block diagram form in order not to obscure embodiments of the invention. In the following description, the notation '0x' indicates the number that follows is in hexadecimal format.

Figure 1:
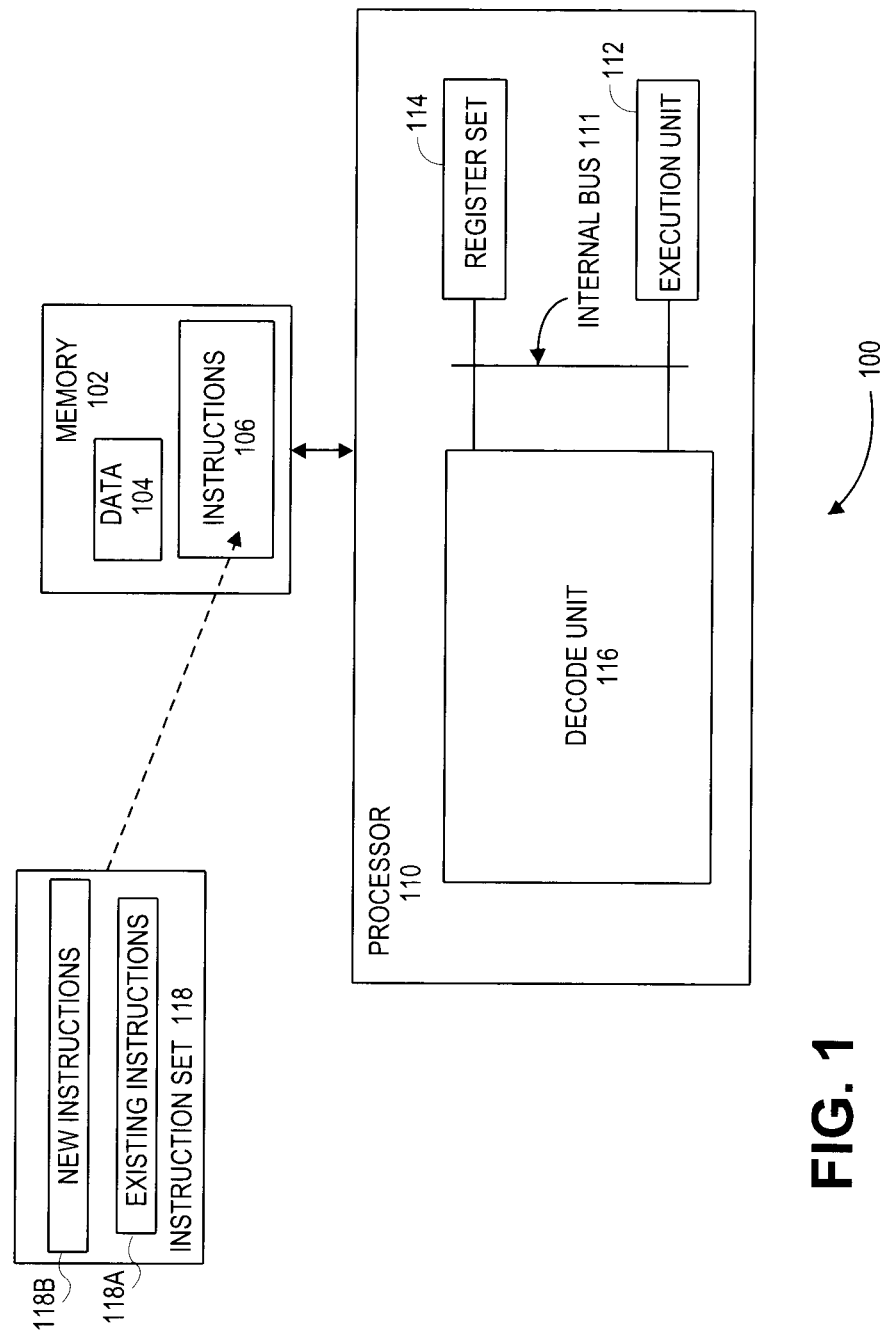
FIG. 1 is a block diagram illustrating a processing system, in which at least one embodiment may be used.

Reference to FIG. 1 illustrates a processing system 100, in which at least one embodiment of the invention may be used. System 100 may be used, for example, to decode and execute new instruction types 118*b* or existing instructions 118*a* in instruction set 118. In one embodiment, a processing system includes any system that has a processor 110, such as, for example; a digital signal processor (DSP), a microcontroller, an application specific integrated circuit (ASIC), or a microprocessor. The processor 110 may be of any type of architecture, such as complex instruction set computers (CISC), reduced instruction set computers (RISC), very long instruction word (VLIW), multi-threaded or hybrid architecture. Processing systems may include personal computers (PCs), engineering workstations, personal digital assistants and other hand-held devices, set-top boxes and the like).

FIG. 1 illustrates that the processor 110 includes a decode unit 116, a set of registers 114, at least one execution unit 112, and at least one internal bus 111 for executing instructions. Of course, the processor 110 contains additional circuitry, which is not necessary to understanding the invention. The decode unit 116, registers 114 and execution unit 112 are coupled together by one or more internal bus 111. The decode unit 116 is used for decoding instructions received by processor 110 into control signals and/or microcode entry points. The instructions may be issued to the decode unit 116 by an instruction buffer (such as, e.g., 310 in FIG. 3). In response to these control signals and/or microcode entry points, the execution unit 112 performs the appropriate operations. The decode unit 116 may be implemented using any number of different mechanisms (e.g., a look-up table, a hardware implementation, a programmable logic array ("PLA"), etc.).

The decode unit 116 is shown to be capable of decoding instructions 106 that follow formats defined by an extended instruction set 118. The instruction set 118 includes an existing instruction set 118*a* and a new instruction set 118*b*, which may represent any new instructions that may be introduced to the architecture. The instruction set 118 includes instructions for performing operations on scalar and packed (or vector) data. The format for these operations can be any convenient format, including single-precision, double-precision, and extended floating-point numbers, signed and unsigned integers, and non-numeric data. For at least one embodiment, the instructions defined in the instruction set 118 may vary in length from one another.

Instructions 106, which follow the formats set forth by the instruction set 118, may be stored in a memory system 102. Memory system 102 is intended as a generalized representation of memory or memory hierarchies and may include a variety of forms of memory, such as a hard drive, CD-ROM, random access memory (RAM), dynamic random access memory (DRAM), static random access memory (SRAM), flash memory and related circuitry. Memory system 102 may store, in addition to instructions 106, data 104 represented by data signals that may be executed by processor 110.

Instruction Format

Figure 2:
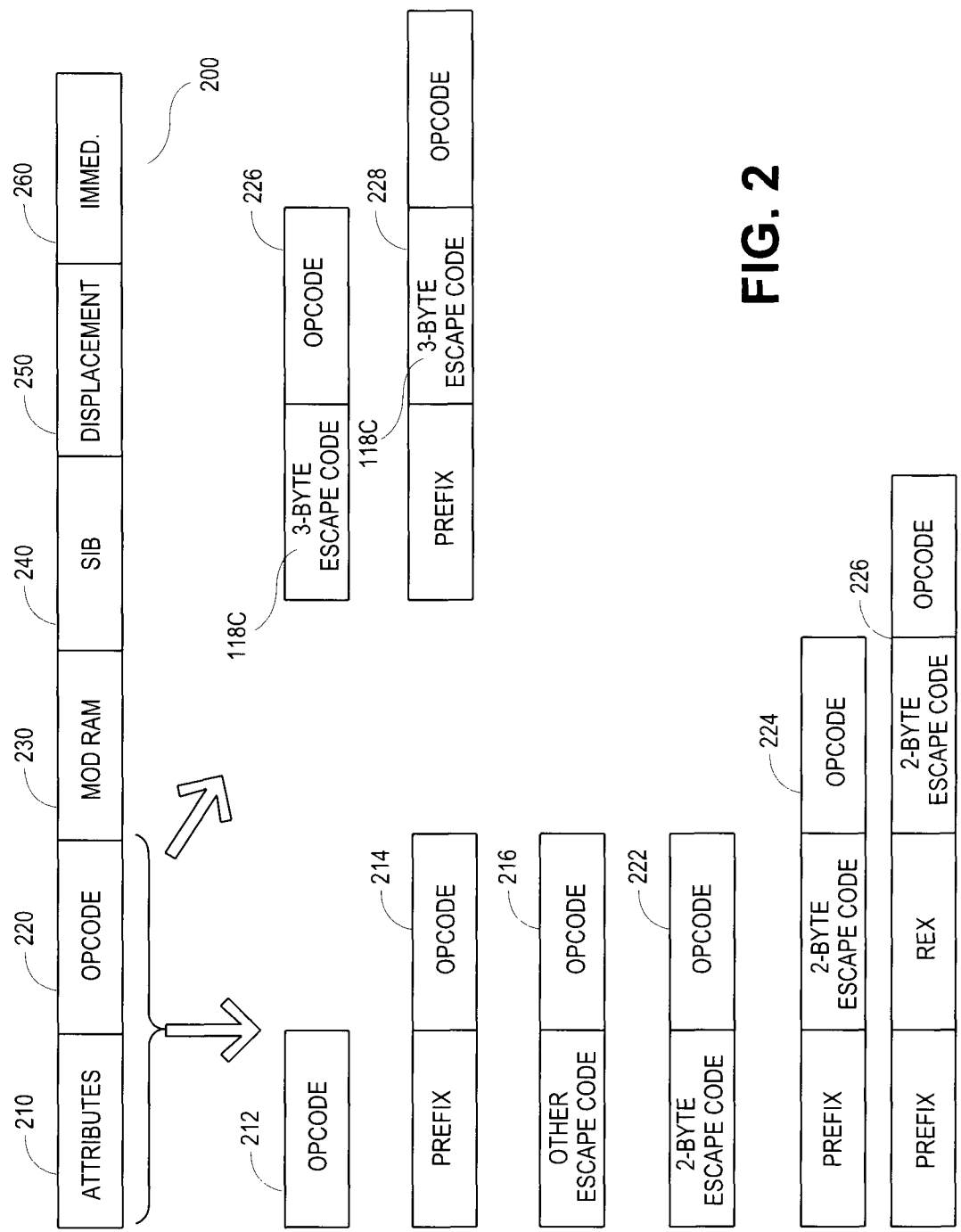
FIG. 2 is a block diagram illustrating an instruction format which may include fields represented by one embodiment.

FIG. 2 is a diagram illustrating a format of an instruction 200 which may include fields represented by one embodiment of the invention. The instruction format 200 includes a prefix field 210, an opcode field 220, and operand specifier fields (e.g., modR/M, scale-index-base, displacement, immediate, etc.). The operand specifier fields may be optional and include a modR/M field 230, an SIB field 240, a displacement field 250, and an immediate field 260.

In one embodiment, the term "escape opcode" refers to a two-byte value that indicates to decoder logic that an opcode to which an instruction corresponds may have various attributes, such as a three-byte opcode, in which two bytes correspond to the escape opcode and a third byte corresponds to an opcode indicating the function of the instruction. For example, in one embodiment, the two-byte value in the three-byte escape field may be one of the following values: 0x0F38, 0x0F39, 0x0F3A or 0x0F3B. The contents of the modR/M field 230 indicate an addressing-form. The modR/M field may specify registers and addressing modes.

Certain encodings of information in the modR/M field 230 may indicate that a second byte of addressing information is present in the SIB (Scale/Index/Base) field 240 to fully specify the addressing form of the instruction code. For instance, a base-plus-index addressing form and a scale-plus-index addressing form may each include information, such as scale factor, register number for the index, and/or register number of the base register, in the SIB field 240.

One skilled in the art will recognize that the format 200 set forth in FIG. 2 is illustrative, and that other organizations of data within an instruction code may be utilized with disclosed embodiments. For example, the fields 210, 220, 230, 240, 250, 260 need not be organized in the order shown, but may be re-organized into other locations with respect to each other and need not be contiguous. Also, the field lengths discussed herein should not be taken to be limiting. A field discussed as being a particular member of bytes may, in alternative embodiments, be implemented as a larger or smaller field. Also, the term "byte," while used herein to refer to an eight-bit grouping, may in other embodiments be implemented as a grouping of any other size, including 4 bits, 16 bits, and 32 bits.

As used herein, an instruction (such as one of the instructions 106 illustrated in FIG. 1) includes certain values in the fields of the instruction format 200 shown in FIG. 2. Such an instruction is sometimes referred to as "an actual instruction." The bit values for an actual instruction are sometimes referred to collectively herein as an "instruction code."

The acceptable byte values for an actual instruction are specified in the instruction set 118 (FIG. 1). Acceptable byte values for each of the fields of the instruction format 200 are those values that decode logic, such as instruction length decoder 306 (FIG. 3) and decode unit 116 (FIG. 1), recognize and operate upon to generate decoded instruction code. For each instruction code, the corresponding decoded instruction code uniquely represents an operation to be performed by the execution unit 112 (FIG. 1) responsive to the instruction code. The decoded instruction code may include one or more micro-operations.

The prefix field 210 illustrated in FIG. 2 may include a number of prefixes. In one embodiment, the prefix field 210 includes up to four prefixes, with each prefix being one byte.

In some applications, such as for an extended instruction set, the prefix field may be used to extend the opcode instruction space. Furthermore, in at least one embodiment, the prefix may be encoded to provide as much or more information about the instruction as in the prior art, but requiring less storage area than instructions using some prior art prefix encodings.

The contents of the opcode field 220 specify one or more operations to be performed by a processor executing the instruction. For at least one embodiment, the opcode field may include three bytes. In other embodiments, the opcode may include one, two or more than three bytes. For some instructions, the three-byte escape opcode value in the two-byte field 118*c* of the opcode field 220 is combined with the contents of a third byte 225 of the opcode field 220 to specify an operation. This third byte 225 is referenced to herein as an instruction-specific opcode. For some instructions, the three-byte escape opcode value in the two-byte field 118*c* of the opcode field 220 is combined with the contents of the prefix field 210 and the contents of the instruction-specific opcode field 225 of the opcode field 220 to specify an operation.

In general, the combination of the prefix field 210 and the opcode field 220 creates a number of different types of instructions. For illustrative purposes, FIG. 2 shows only seven types of instructions: a regular one-byte instruction 212, a regular instruction with prefix as qualifier 214, a regular escape instruction 216, a first extended instruction type 222, a second extended instruction type 224, a first new instruction type 226 and a second new instruction type 228. As is known by one skilled in the art, other types of instruction can be similarly defined. In one extended instruction type 226, a REX field is included to indicate the registers to be used with the instruction. For example, one instruction type indicated by the REX enables additional registers in 64-bit mode.

The regular one-byte instruction 212 includes regular instructions with one-byte instruction-specific opcodes in the opcode field 220. The regular instruction with prefix as qualifier 214 includes regular instructions that use the prefix as a qualifier for the opcode. For example, a string instruction may use a REPEAT prefix value to repeat the string instruction by a number of times specified in the count register or until a certain condition is met. The prefix value used in instruction 214 does not add a completely new meaning to the opcode value that follows in the opcode field 220. Rather, the prefix value is merely used as a qualifier to qualify the opcode with additional conditions. The use of the prefix in the instruction 214 may be different for different instruction types.

In one embodiment, the regular escape instruction 216 is a regular instruction that utilizes an escape opcode in a first field 215 of the opcode field 220 to indicate to decoder hardware that an instruction-specific opcode in a second field 217 of the opcode field 220 is used to define the instruction. For example, in one embodiment, a floating-point coprocessor escape opcode value 0xD8 through 0xDF in the first byte 215 of the opcode field 220 indicates that the opcode value that follows in the second byte 217 of the opcode field 220 should be interpreted as a coprocessor instruction and should be directed to coprocessor hardware for execution.

The first extended instruction type 222 is a particular type of escape instruction that is defined to contain a predefined escape opcode value, 0x0F, in a first field 221 of the opcode field 220. The escape opcode 0x0F indicates to decoder hardware that an instruction-specific opcode value in a second field 223 of the opcode field 220 is used to define the instruction. Instructions of the first extended instruction type 222 may, depending on the value of the second opcode byte (and, in some cases, the value of three bits of the modR/M field 230), be of varying lengths. For example, two instructions (Packed Shift Left Logical) of extended instruction type 222 may include the following instruction field values, respectively:

PSLLW (shift value in register): 0F:F1:1b"11xxxyyy", where xxx defines a first register and yyy defines a second register PSLLW (shift by immed. value): 0F:71:1b"11110xxx": immed data (8 bits), where xxx defines a register In each of the PSSLW instructions set forth, the first word of the opcode field 220 includes the escape value 0x0F. The first instruction is three bytes long but the second instruction is four bytes because it includes a byte of immediate data. Accordingly, for extended instruction type 222 decoder hardware (such as, for example, instruction length decoder 306 in FIG. 3) utilizes the escape opcode value 0x0F in the first field 221 of the opcode field 220 as well as the value in the second byte 223 of the two-byte opcode field 220 and the value of modR/M field 230 to decode the length of the instruction.

Examples of Instruction Prefixes and Escape Opcodes

Instruction prefixes were originally developed to enhance a set of instructions. For example, the repeat prefix is developed to repeat a string instruction. The repeat prefix codes are 0xF3 (REP, REPE) and 0xF2 (REPNE). The prefix used as such does not define a new meaning for the opcode that follows. It merely defines additional operational conditions for the opcode.

Escape opcodes provide an extension to the instruction set. For example, the escape opcodes 0xD8 through 0xDF are used to indicate that the second opcode byte 217 contains a value defining an instruction for the floating-point unit. The decoder passes the opcode to the floating-point decoder.

For at least one\instruction set, a 3-byte escape opcode is a two-byte entity having a value of 0x0F3y, where y is 0x8, 0x9, 0xA or 0xB. The 3-byte escape opcode value in the 3-byte escape code field 118c indicates to the decoder that the instruction-specific opcode value in the third byte 225 of the opcode field 200 indicates an instruction in a new instruction set. A new instruction set may be any new instruction set added to the architecture.

In contrast to a 2-byte escape opcode, the value in the 3-byte escape opcode field 118c indicates to the decoder the method to be used to determine the length of the instruction. That is, each value for the 3-byte escape opcode is associated with a particular method to be used to determine the instruction length for every instruction in the map corresponding to the particular 3-byte escape code. For instance, the value 0x0F38 in the 3-byte escape opcode field 118c is associated with an associated opcode map. The length for each instruction in the 0x0F38 opcode map may be calculated using the same length-determination method used to determine the length of the other instructions in the 0x0F38 opcode map.

Similarly, the length of each instruction of the respective opcode maps associated with the remaining 3-byte escape opcode values (0x0F39, 0x0F3A, 0x0F3B) may be calculated with the same length-determination logic used to determine the length of the other instructions in the respective opcode map.

The length-determination logic used to determine the length of instructions for each instruction in one of the new opcode maps is simplified in that the same set of input terms is evaluated to determine the length of each instruction in the opcode map. Such length-determination logic is referred to herein as a "fixed-input" logic or method. That is, each input term evaluated to determine the length of one instruction in the map is also relevant to determination of the length of every other instruction in the map. The fixed set of terms to be evaluated may differ from opcode map to opcode map. While the set of inputs to be evaluated may differ among opcode maps, the inputs evaluated to determine instruction length are the same across all instructions in a give 3-byte opcode map.

The combination of a prefix and an escape opcode provides a significant enlargement of a processor's opcode table to allow additional new instruction sets. This combination uses the existing prefix codes to define a new set of instructions, in addition to the instruction set created by the escape opcodes. By using the existing prefix codes, the decoding circuitry for the existing instruction set may remain relatively unmodified to support decoding of the new instructions 118c (FIG. 1).

The instruction-specific opcode values (in the third byte 225 of the opcode field 220) of some or all of the new instructions may be the same as the opcodes of the existing instructions. By using the same opcodes with the prefix and escape opcodes to define a new set of instructions, the decoding circuitry may be less complex than having a completely new set of opcodes for the new instruction set.

In one embodiment, the prefix value is used to define new instructions. Furthermore, prefixes can still be used in the traditional role of enhancing the opcode or qualifying the opcode under some operational condition.

Table 1, below, illustrates some prior art examples of an instruction set using prefixes and three-byte escape opcodes.

TABLE 1

| Instruction | (Prefix)/Escape Opcode/Instruction-specific opcode (in hex) | Definition |
| --- | --- | --- |
| PHADDW | 0F 38 01/r | Add horizontally packed numbers from 64-bit register or memory to 64-bit register |
| PHADDW | (66)0F 38 01/r | Add horizontally packed numbers from 128-bit register or memory to 128-bit register |
| PHADDD | 0F 38 02/r | Add horizontally packed numbers from 64-bit register or memory to 64-bit register |
| PHADDD | (66)0F 38 02/r | Add horizontally packed numbers from 128-bit register or memory to 128-bit register |
| PHADDSW | 0F 38 03/r | Add horizontally packed numbers with saturation from 64-bit register or memory to 64-bit register |
| PHADDSW | (66)0F 38 03/r | Add horizontally packed numbers with saturation from 128-bit register or memory to 128-bit register |
| PHSUBW | 0F 38 05/r | Subtract horizontally packed signed words in 64-bit register or memory to 64-bit register |

TABLE 1-continued

| Instruction | (Prefix)/Escape Opcode/Instruction-specific opcode (in hex) | Definition |
|---|---|---|
| PHSUBW | (66)0F 38 05/r | Subtract horizontally packed signed words in 128-bit register or memory to 128-bit register |
| PHSUBD | 0F 38 06/r | Subtract horizontally packed signed double words in 64-bit register or memory to 64-bit register |
| PHSUBD | (66)0F 38 06/r | Subtract horizontally packed signed double words in 128-bit register or memory to 128-bit register |
| PHSUBSW | 0F 38 07/r | Subtract horizontally packed signed words in 64-bit register or memory to 64-bit register as saturated result |
| PHSUBSW | (66)0F 38 07/r | Subtract horizontally packed signed words in 128-bit register or memory to 128-bit register as saturated result |
| PMADDUBSW | 0F 38 04/r | Multiply and add packed signed and unsigned number in 64-bit register or memory to 64-bit register |
| PMADDUBSW | (66)0F 38 04/r | Multiply and add packed signed and unsigned number in 128-bit register or memory to 128-bit register |
| PMULHRSW | 0F 38 0B/r | Packed multiply high with round and scaling from 64-bit register or memory to 64-bit register |
| PMULHRSW | (66)0F 38 0B/r | Packed multiply high with round and scaling from 128-bit register or memory to 128-bit register |
| PSHUFB | 0F 38 050/r | Packed shuffle bytes in 64-bit register or memory to 64-bit register |
| PSHUFB | (66)0F 38 00/r | Packed shuffle bytes in 128-bit register or memory to 128-bit register |
| PSIGNB | 0F 38 08/r | Packed sign byte 64-bit register or memory to 64-bit register |
| PSIGNB | (66)0F 38 08/r | Packed sign byte 128-bit register or memory to 128-bit register |
| PSIGNW | 0F 38 09/r | Packed sign word 64-bit register or memory to 64-bit register |
| PSIGNW | (66)0F 38 09/r | Packed sign word 128-bit register or memory to 128-bit register |
| PSIGND | 0F 38 0A/r | Packed sign double word 64-bit register or memory to 64-bit register |
| PSIGND | (66)0F 38 0A/r | Packed sign double word 128-bit register or memory to 128-bit register |
| PSRMRG | 0F 3A 0F/r | Pack shifted right and merge contents of 64-bit register or memory to 64-bit register |
| PSRMRG | (66)0F 3A 0F/r | Pack shifted right and merge contents of 128-bit register or memory to 128-bit register |
| PABSB | 0F 38 1C/r | Packed byte absolute value of value in 64-bit register or memory to 64-bit register as unsigned result |
| PABSB | (66)0F 38 1C/r | Packed byte absolute value of value in 128-bit register or memory to 128-bit register as unsigned result |
| PABSW | 0F 38 1D/r | Packed word absolute value of value in 64-bit register or memory to 64-bit register as unsigned result |
| PABSW | (66)0F 38 1D/r | Packed word absolute value of value in 128-bit register or memory to 128-bit register as unsigned result |
| PASBSD | 0F 38 1E/r | Packed double word absolute value of value in 64-bit register or memory to 64-bit register as unsigned result |
| PABSD | (66)0F 38 1E/r | Packed double word absolute value of value in 128-bit register or memory to 128-bit register as unsigned result |

In the above examples, the instructions with the prefix 0x66 relate to instructions that utilize one or more extended-size registers (such as 128-bit register size), while the instructions without the prefix 0x66 relate to instructions that utilize one or more smaller-size registers (such as 64-bit register size). The smaller-size registers are referred to herein as "regular length" registers. As is known by one skilled in the art, the exact codes for prefixes are implementation-dependent and the 0x66 prefix value discussed above is merely for illustrative purposes.

The original x86 instruction set provided for a 1-byte opcode with various formats of address syllable and immediate operand contained in additional bytes whose presence was known from the first "opcode" byte. Additionally, there were certain byte values that were reserved as modifiers to the opcode (called prefixes, as they had to be placed before the instruction). When the original palette of 256 opcode bytes (including these special prefix values) was exhausted, a single byte was dedicated as an escape to a new set of 256 opcodes. As vector instructions (e.g., SIMD) were added, a need for more opcodes was generated, and the "two byte" opcode map also was insufficient, even when expanded through the use of prefixes. To this end, new instructions were added in additional maps which use 2 bytes plus an optional prefix as an identifier.

Additionally, in order to facilitate additional registers in 64-bit mode, an additional prefix may be used (called "REX") in between the prefixes and the opcode (and any escape bytes necessary to determine the opcode). In one embodiment, the REX may have 4 "payload" bits to indicate use of additional registers in 64-bit mode. In other embodiments it may have fewer or more than 4 bits. The general format of at least one instruction set is illustrated generically by the following:

[prefix] [rex] escape [escape2] opcode (etc.)

In this example "etc." represents the address syllable (e.g., one to six bytes) and perhaps additional immediate information for the instruction.

As new instruction sets are added, it can be seen that the size of instructions, including prefix, data-size indicator, escape codes, opcodes, and intermediate, address fields, etc., are causing the code size to expand, which can be undesirable for a number of reasons.

Figure 7:
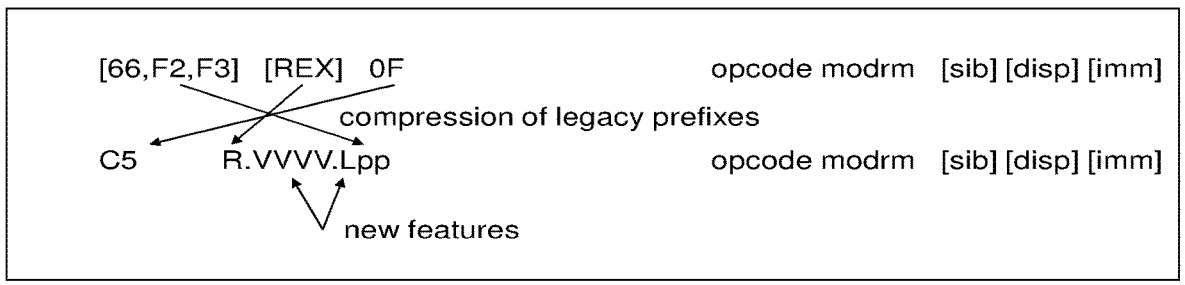
FIG. 7 illustrates an embodiment of an instruction format.

In order to enable new instruction set extensions, while remaining backward compatible with existing and legacy instruction sets, a new instruction encoding technique may be desirable. Accordingly, at least one embodiment of the invention includes an instruction encoding that enables backward compatibility, enhanced functionality, while reducing code size. In one embodiment, the instruction encoding uses a new byte to indicate whether the instruction requires a second extension field or not. The following illustration shows a legacy instruction and how at least one embodiment of the invention at least maintains if not improves the code size to which the instruction contributes. In the example illustrated In FIG. 7, the legacy escape field is replaced with a new escape field, legacy prefixes are partially compressed as part of a "payload" byte, legacy prefixes may be reclaimed and made available for future instruction expansion, and new features are added (e.g., increased vector length increase and additional source register specifier.

As can be seen above, the non-fixed part of the instruction (prefix, REX, escape code) has gone from a range of 1 to 3 bytes to 2 bytes. In the worst case, the instruction encoding according to one embodiment adds only one byte the legacy encoding, and in the best case, it saves one byte of encoding over the legacy encoding. In the above example, the byte-long prefix, "[66, F2, F3]", is represented by two bits "pp", a field of the REX byte is represented by one bit, "R", and the escape byte is re-coded from "0F" to "C5" (which will be discussed below). Furthermore, a 4-bit field, "VVVV" has been added to specify an extra source operand, and an increased vector size has been provided for through vector size bit "L", which may designate either a 128 bit or a 256 bit vector size.

Figure 8:
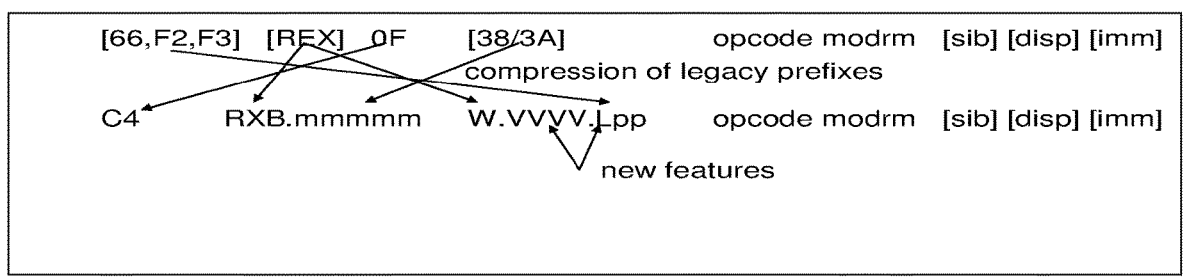
FIG. 8 illustrates an embodiment of an instruction format.

The following illustrates an embodiment using two bytes to encode an instruction set instruction, which may be used when a second escape code is present in the original instruction, or when extra bits (e.g, the XB and W fields) in the REX field need to be used. In the embodiment illustrated in FIG. 8, legacy Escape is represented by a new escape value, legacy prefixes are fully compressed as part of the "payload" bytes, legacy prefixes are reclaimed and available for future expansion, the second escape code is compressed in a "map" field, with future map or feature space available, and new features are added (e.g., increased vector length and an additional source register specifier).

In the above illustration, the original instruction is assumed to use either the REX or the "escape2" fields (or both), and as a result the length of the non-fixed part of the instruction has gone from a range of 2 to 4 bytes to 3 bytes. In the worst case, one embodiment of the invention increases the original instruction encoding by 1 byte, in the best case, the embodiment decreases the original instruction encoding by 1 byte. In contrast to the single escape code example mentioned before, the REX byte is represented by 4 bits (RXB and W) and the second escape field is present and encoded in 5 bits ("mmmmm") instead of using a discrete byte as in the prior art encoding.

Although embodiments disclosed use 5 bits to compress up to 32 different values of escape2 code bytes, in other embodiments, bits from the escape2 code bits may be used for other functions, such as extending the vector length to 4 combinations (illustrated below, where the "mmmmm" bits are renamed as 'L') and maintaining the ability to encode 16 different escapes.

| C4 | RXB.mmmmm | W.VVVV.Lpp |
| C4 | RXB.L'.mmmm | W.VVVV.Lpp |

Similarly, if only 4 values of escape2 code are needed, then the upper "mmmmm" bits could be renamed to indicate the QRS feature, which may assume seven values other than the original "default behavior" value compatible with the original implementation.

| C4 | RXB.QRS.mm | W.VVVV.Lpp |

In the above examples, the escape code is "C4", indicating that the instruction is represented by the second encoding rather than one mentioned before, indicated by "C5". It should be noted that the choice of values "C5" and "C4" values and the encoding of the payloads is chosen so that it will be backwards compatible with unimplemented opcodes on current processors of at least one architecture (e.g., x86). One of ordinary skill in the art will recognize that C5 and C4 correspond to the "LDS" and "LES" instructions, respectively, which are legal under opcodes in an x86 architecture.

In some embodiments, instructions in the format, "[prefixes] [REX] [escape bytes] opcode [additional bytes to end of instruction]", may be translated into a more compact and efficient format, "[Attributes] [opcode] [additional bytes to end of instruction]", where the "Attributes" field may include fewer bits than the original instruction from which it was translated.

In addition to instruction sets mentioned herein, other instructions from other instruction sets may also benefit from embodiments of the invention.

Instruction Decoding

Figure 3:
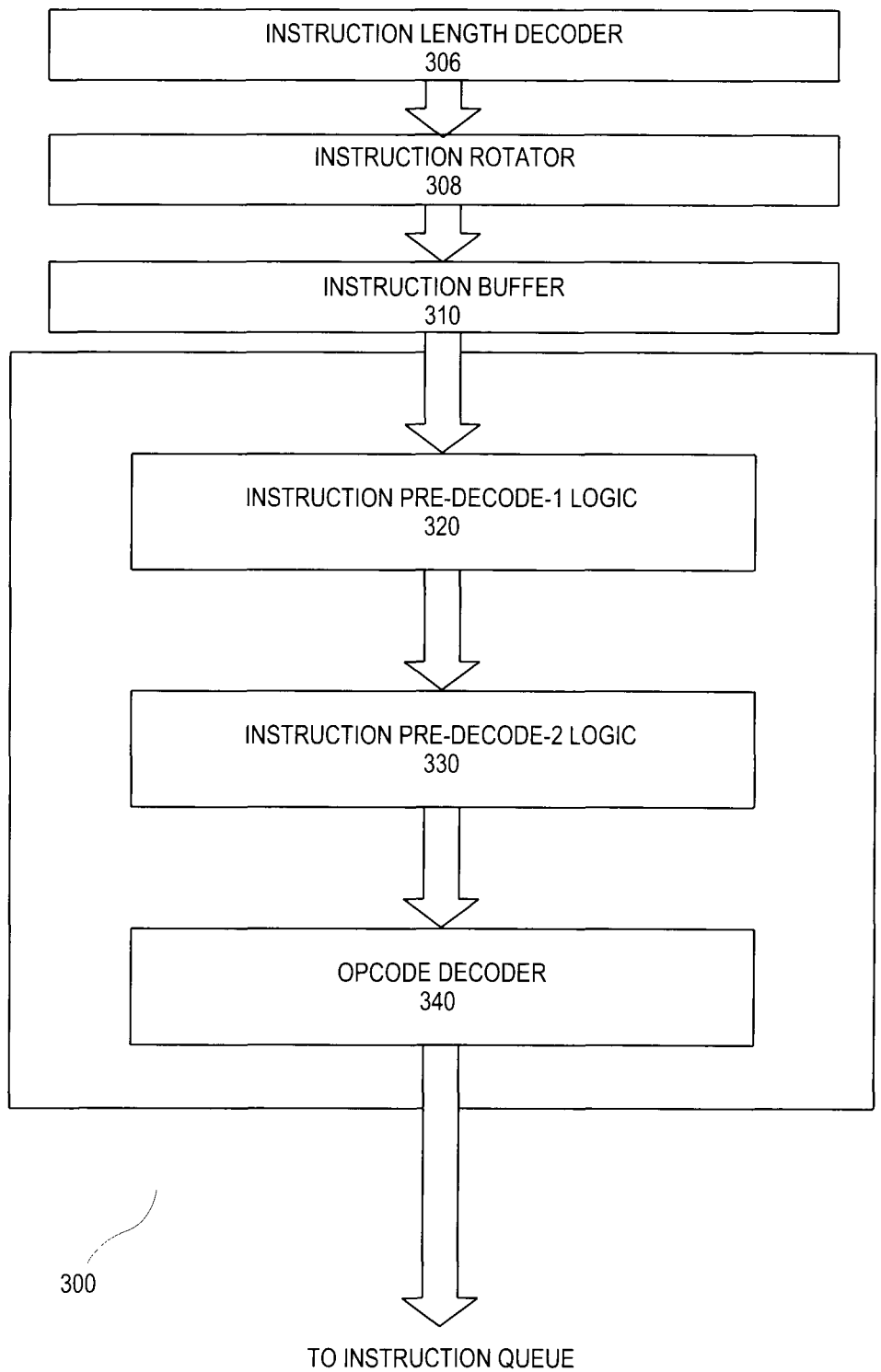
FIG. 3 is a block diagram illustrating logic to decode an instruction, in accordance with at least one embodiment.

FIG. 3 is a diagram illustrating a logic 300 to decode variable-length instructions. The logic 300 may include an instruction length decoder 306, an instruction rotator 308, an instruction buffer 310, a first pre-decode logic 320, a second pre-decode logic 330, and an opcode decoder 340. The first phase pre-decode logic 320, the second phase pre-decode logic 330, and the opcode decoder 340 form all or part of the decode unit 116 illustrated in FIG. 1. While illustrated as a single entity, any or each of first phase pre-decode logic 320, the second phase pre-decode logic 330, and the opcode decoder 340 may be implemented as separate logic blocks.

The instruction length decoder 306 determines the length of an actual instruction code that has been fetched from external memory (such as, e.g., memory 102, FIG. 2). For illustrative purposes, an instruction code is assumed to include up to five bytes: the first byte corresponds to $I_N$ to $I_{N+7}$, the second byte corresponds to $I_K$ to $I_{K+7}$, the third byte corresponds to $I_L$ to $I_{L+7}$, the fourth byte corresponds to $I_M$ to $I_{M+7}$, and the fifth byte corresponds to $I_P$ to $I_{P+7}$, where $I_N$ to $I_{N+7}$, $I_K$ to $I_{K+7}$, $I_M$ to $I_{M+7}$ to $I_{L+7}$, and $I_P$ to $I_{P+7}$ refer to the bit positions of the instruction code. In practice, however, an actual instruction may include more than five bytes in its instruction code. Similarly, an actual instruction may include less than five bytes in its instruction code.

For at least one embodiment, the five illustrates bytes of the instruction code are contiguous, such that K=N+8, L=K+8 and L=N+16, and M=L+8, M=K+16 and M=K+24, and so on. However, as is discussed above in connection with FIG. 2, the fields of the format 200 illustrated in FIG. 2 need not occupy the positions shown. Accordingly, the illustrative five bytes of an instruction code that are discussed herein may be in any order and need not be contiguous.

One of skill in the art will recognize that logic of the instruction length decoder 306 may implement fairly complex length decode methods in a system that supports variable-length instructions. This is especially true in systems that require different methods, that evaluate different inputs, to determine instruction length for instructions within the same opcode map. In some embodiments, the length of each instruction within an opcode map is determined by a single fixed-input length-determination logic.

The rotator 308 rotates the raw instruction bytes such that the first byte to be decoded is in an initial position. The rotator 308 thus identifies the beginning of the instruction bytes to be decoded. It should be noted that, although the rotator 308 may identify the first byte of an instruction, such as a prefix byte, the first byte need not be identified.

The instruction buffer 310 receives and stores the instructions that have been fetched from the external memory. For at least one embodiment, the instructions are length-decoded and rotated before being received by the instruction buffer 310. For at least one embodiment, the instruction buffer 310 is implemented as an instruction cache.

The first phase instruction pre-decoder 320 receives the instruction bytes and detects the presence of one or more of a set of predefined prefixes and/or escape codes and/or opcodes used as part of an instruction set. The second phase pre-decode logic 330 utilizes the results of the pre-decoder 320 to translate the instruction information received from a prior art instruction format to one in accordance with one embodiment. The translated instruction is then sent to the opcode decoder 340 to generate instruction signals (e.g., micro-operations) consistent with the desired instruction operation.

In one embodiment, the translation logic 340 translates an instruction of format, "[prefixes] [REX] [escape bytes] opcode [additional bytes to end of instruction]", into a more compact and efficient format, "[Attributes] [opcode] [additional bytes to end of instruction]". In other embodiments, other instructions having other instruction formats are translated into the above compact format.

Figure 4:
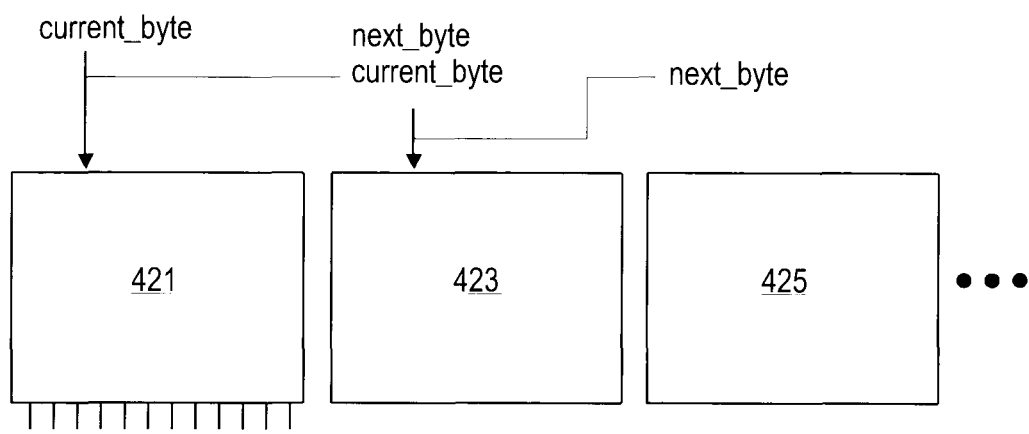
FIG. 4 is a diagram illustrating a first phase decoder, according to one embodiment.

FIG. 4 is a block diagram illustrating at least one embodiment of a first phase pre-decoder logic 420. In one embodiment, the pre-decoder 420 receives a fetched cacheline and produces information for bytes within the instruction. For instance, if a byte of the received instruction contains 0x66 the pre-decoder logic 420 may realize the following algorithm: If 0x66 is located within the prefix portion of the instruction, otherwise, if 0x66 is located in the opcode byte and preceded by 0x0F then the 0x0F is an escape code and the opcode corresponds to a first opcode map entry, otherwise if 0x66 is located in the opcode byte and not preceded by 0x0F then there is no escape code in the instruction and opcode corresponds to a second opcode map entry, if 0x66 is in the modr/m (address specifier) field in 32-bit mode, then 0x66 has a four byte displacement, etc.

As illustrated in FIG. 4, the pre-decoder logic 420 may include parallel logic, implemented in programmable logic arrays 421, 423 425, etc., enabled to decode corresponding portions of an instruction, such as the prefix, escape codes, opcodes, etc. Each portion 421-425, in one embodiment may interpret its respective instruction portion as meaning various things, according to the value in the corresponding instruction portion, as illustrated for logic array 421 in FIG. 4. After each portion of the instruction has been pre-decoded by logic 420 to determine what each portion means, the instruction may then be passed to a second pre-decode phase (illustrated as 320 in FIG. 3) to translate the instruction into a more efficient and compact encoding scheme, according to one embodiment.

Figure 5:
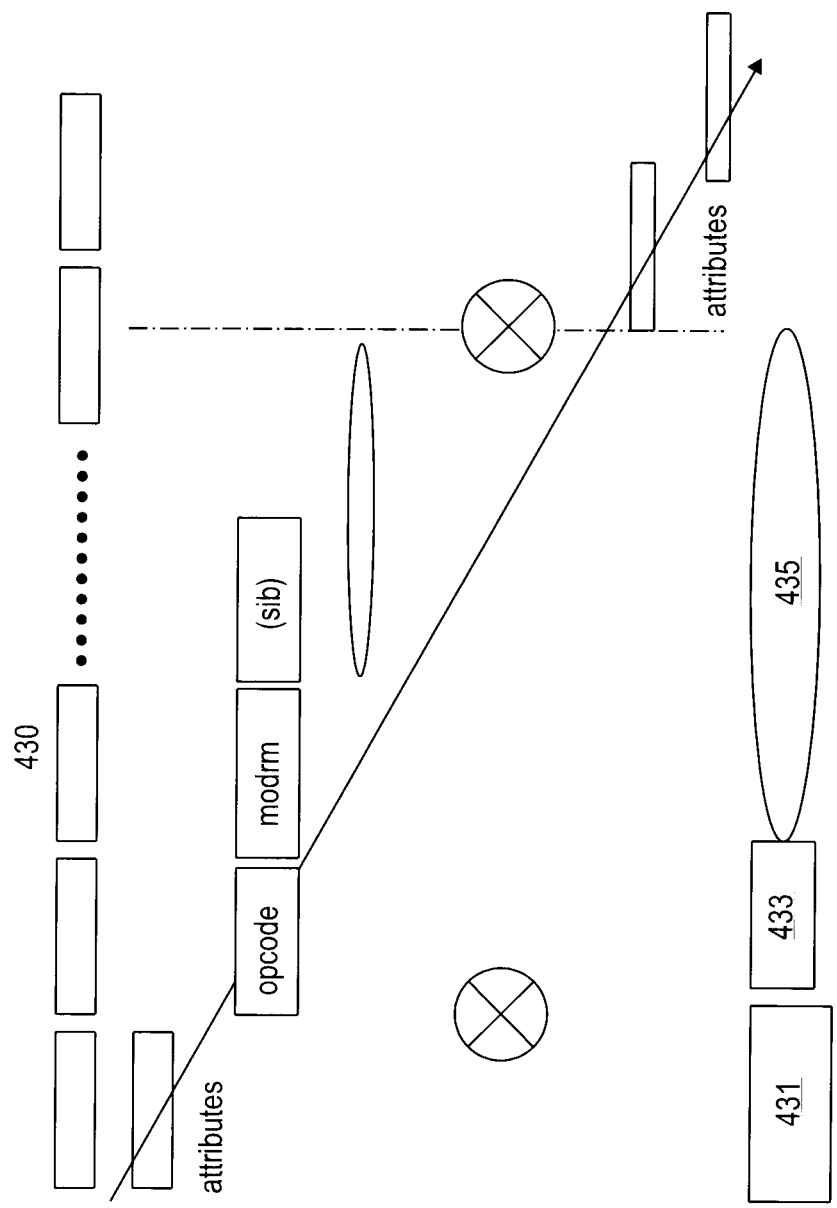
FIG. 5 is a diagram illustrating a second phase decoder, according to one embodiment.

FIG. 5 illustrates a second phase pre-decode logic 430 to translate an instruction into a format consistent with at least one embodiment of the invention. For each opcode pre-decoded by the first pre-decode logic illustrated in FIG. 4, an attribute field 431, opcode field 433, and address/data/intermediate/etc field 435 is decoded and sent to opcode decoder logic (illustrated as 340 in FIG. 3) to decode the opcode into signals to carry out the operations prescribed by the opcode. In one embodiment, attribute filed 431 may include bits to indicate the information described previously, including prior art opcode map information (e.g., escape codes), REX information, and prefix information, as well as new information according to one embodiment, such as an extra source register address and an expanded vector size.

Figure 6:
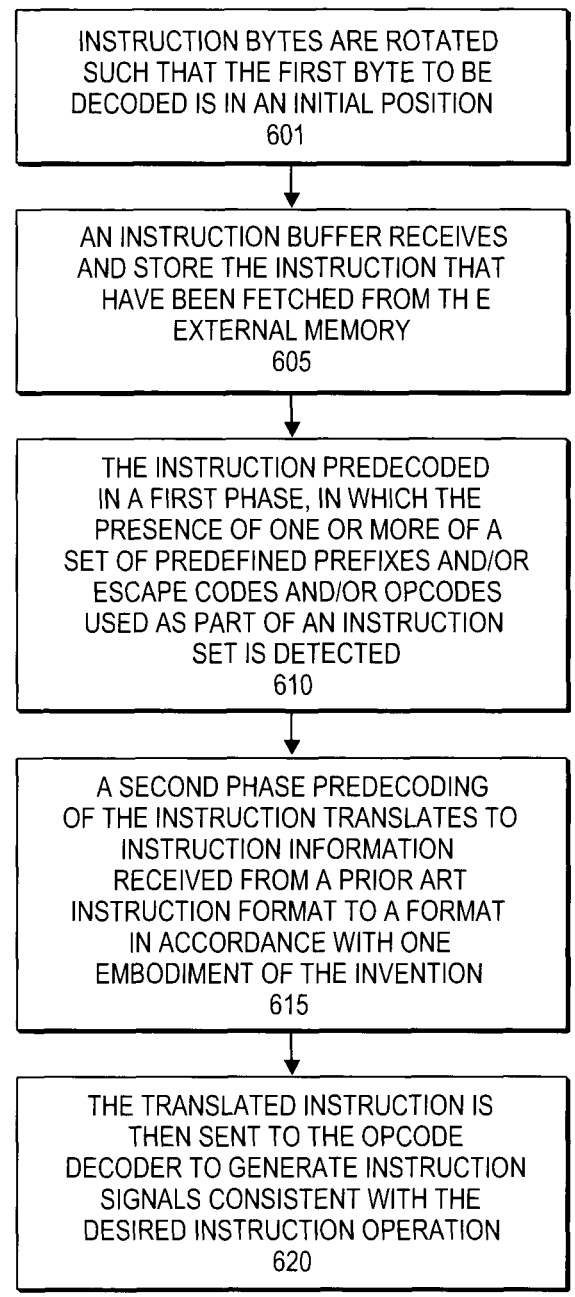
FIG. 6 is a flow diagram illustrating operations to perform one embodiment.

FIG. 6 is a flowchart illustrating operations to perform an instruction decoding and translation technique according to at least one embodiment. At operation 601, instruction bytes are rotated such that the first byte to be decoded is in an initial position. At operation 605, an instruction buffer receives and stores the instructions that have been fetched from the external memory. At operation 610, the instruction is pre-decoded in a first phase, in which the presence of one or more of a set of predefined prefixes and/or escape codes and/or opcodes used as part of an instruction set is detected. At operation 615, a second phase pre-decoding of the instruction translates the instruction information received from a prior art instruction format to a format in accordance with one embodiment of the invention. At operation 620, the translated instruction is then sent to the opcode decoder to generate instruction signals consistent with the desired instruction operation.

While particular embodiments of the present invention have been shown and described, it will be obvious to those skilled in the art that changes and modifications can be made without departing from the present invention in its broader aspects. The appended claims are to encompass within their scope all such changes and modifications that fall within the true scope of the present invention.

What is claimed is:

1. An apparatus comprising:
   instruction decode logic circuitry to decode an instruction that is to utilize a format including a multi-byte prefix that at least includes four bits to designate a third operand, a single bit to designate a vector size, and two bits to indicate a legacy prefix; and
   execution circuitry to execute the decoded instruction according to an opcode of the instruction.

2. The apparatus of claim 1, wherein a first byte of the multi-byte prefix is 0xC4.

3. The apparatus of claim 1, wherein a first byte of the multi-byte prefix is 0xC5.

4. The apparatus of claim 1, wherein the instruction format is to include a scale, index, and base (SIB) field.

5. The apparatus of claim 1, wherein the instruction format is to include a displacement field.

6. The apparatus of claim 1, wherein the instruction format is to include an immediate field.

7. The apparatus of claim 1, wherein the single bit is to indicate the vector size is to designate either 128-bit or a 256-bit vector size.

8. The apparatus of claim 1, wherein the legacy prefix is one of: none, 0x66, 0xF3, and 0xF2.

9. A method comprising:
   decoding an instruction that is to utilize a format including a multi-byte prefix that at least includes four bits to designate a third operand, a single bit to designate a vector size, and two bits to indicate a legacy prefix; and
   executing the decoded instruction according to an opcode of the instruction.

10. The method of claim 9, wherein a first byte of the multi-byte prefix is 0xC4.

11. The method of claim 9, wherein a first byte of the multi-byte prefix is 0xC5.

12. The method of claim 9, wherein the instruction format is to include a scale, index, and base (SIB) field.

13. The method of claim 9, wherein the instruction format is to include a displacement field.

14. The method of claim 9, wherein the instruction format is to include an immediate field.

15. The method of claim 9, wherein the single bit to indicate the vector size is to designate either 128-bit or a 256-bit vector size.

16. The method of claim 9, wherein the legacy prefix is one of: none, 0x66, 0xF3, and 0xF2.

17. The apparatus of claim 1, further comprising:
   memory to store the instruction.

18. The apparatus of claim 1, wherein the multi-byte prefix is three bytes in size.

19. The apparatus of claim 1, wherein the multi-byte prefix is two bytes in size.

* * * * *